US012666391B2

(12) United States Patent
Liang et al.

(10) Patent No.: US 12,666,391 B2
(45) Date of Patent: Jun. 23, 2026

(54) SYSTEM AND METHOD USING 5G POSITIONING WITH NON-LINE OF SIGHT INFORMATION FROM SENSORS UTILIZING TRANSMISSION AND RECEPTION POINTS AND SOUNDING REFERENCE SIGNALS

(71) Applicant: Hong Kong Applied Science and Technology Research Institute Company Limited, Hong Kong (HK)

(72) Inventors: Yaocheng Liang, Hong Kong (HK); Ho Man Cheng, Hong Kong (HK); Haiming Zhang, Hong Kong (HK); Yau Yau Yolanda Tsang, Hong Kong (HK); Kefei Ma, Hong Kong (HK); Xinyi Liu, Hong Kong (HK); Yuxian Zhang, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 317 days.

(21) Appl. No.: 18/608,849

(22) Filed: Mar. 18, 2024

(65) Prior Publication Data
US 2025/0294516 A1 Sep. 18, 2025

(51) Int. Cl.
*H04W 64/00* (2009.01)
*H04B 17/318* (2015.01)
(Continued)

(52) U.S. Cl.
CPC ........ *H04W 64/006* (2013.01); *H04B 17/328* (2023.05); *H04B 17/336* (2015.01); *H04L 5/0051* (2013.01)

(58) Field of Classification Search
CPC . H04W 64/006; H04B 17/328; H04B 17/336; H04L 5/0051
See application file for complete search history.

(56) References Cited

U.S. PATENT DOCUMENTS

| | | | | |
|---|---|---|---|---|
| 12,416,701 B2 * | 9/2025 | Ernström | .............. | G01S 5/0246 |
| 2024/0073851 A1 * | 2/2024 | Yerramalli | ............ | H04W 64/00 |
| 2024/0121747 A1 * | 4/2024 | Chen | ..................... | G01S 5/0268 |

FOREIGN PATENT DOCUMENTS

| | | |
|---|---|---|
| CN | 114979948 A | 8/2022 |
| CN | 115134746 A | 9/2022 |

(Continued)

OTHER PUBLICATIONS

Jianhui Wang et al., "Spatial Multi-Source Information Fusion Localization Algorithm in Non-Line-of-Sight Environments", Sensors, Multidisciplinary Digital Publishing Institute, Mar. 2023, vol. 23, Iss. 7, Article 3482.

(Continued)

*Primary Examiner* — Pakee Fang
(74) *Attorney, Agent, or Firm* — IDEA Intellectual Limited; Sam T. Yip

(57) ABSTRACT
A system using positioning with non-line of sight information from sensors is provided. The system includes a plurality of TRPs, a UE, and a backend server. The TRPs are distributed in a target region. The UE is placed within the target region and the UE comprises at least one sensor for gathering surrounding information at the target region. The backend server comprises a signal receiver, a positioning module, a signal emitter, and a feedback module. The signal receiver is configured to receive first SRSs. The positioning module is configured to compute a preliminary location of the UE according to the first SRS signals. The signal emitter sends a location signal containing the preliminary location of the UE to the UE. The feedback module is configured to receive second SRSs and NLOS information from the UE and to generate at least one positioning estimation result by positioning the UE.

20 Claims, 11 Drawing Sheets

⬤ *Enabled TRP* 110     ◉ *Disabled TRP* 110

120

(51) Int. Cl.
H04B 17/336 (2015.01)
H04L 5/00 (2006.01)

(56) References Cited

FOREIGN PATENT DOCUMENTS

| | | | | | |
|---|---|---|---|---|---|
| CN | 112611384 B | | 1/2023 | | |
| CN | 115733877 A | | 3/2023 | | |
| CN | 116243240 A | | 6/2023 | | |
| CN | 116636265 A | * | 8/2023 | | |
| DE | 102021112407 A1 | | 12/2021 | | |
| KR | 102391139 B1 | | 4/2022 | | |
| KR | 1020220048949 A | | 4/2022 | | |
| WO | WO-2021254887 A1 | * | 12/2021 | ............. | H04B 7/088 |
| WO | WO-2022029198 A2 | * | 2/2022 | ........... | H04L 5/0051 |
| WO | 2022237354 A1 | | 11/2022 | | |

OTHER PUBLICATIONS

ZTE, "R1-2106553 Enhancements on NLOS and Multi-path mitigation for NR positioning", 3GPP tsg_ran\wg1_rl1, Aug. 2021.
International Search Report and Written Opinion of corresponding PCT application No. PCT/CN2024/087848 mailed on Dec. 3, 2024.

* cited by examiner

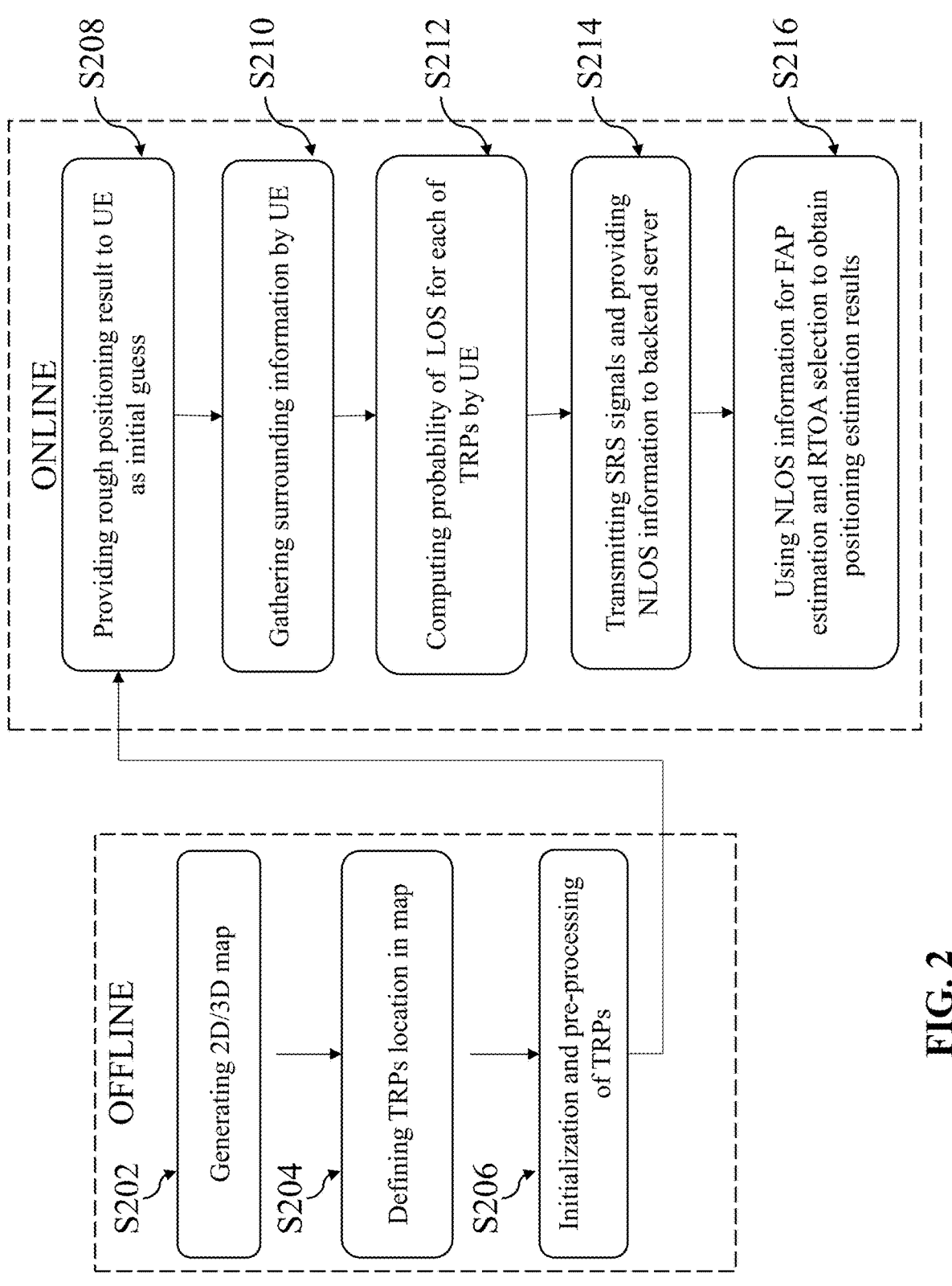

S208 Providing rough positioning result to UE as initial guess

S210 Gathering surrounding information by UE

S212 Computing probability of LOS for each of TRPs by UE

S214 Transmitting SRS signals and providing NLOS information to backend server

S216 Using NLOS information for FAP estimation and RTOA selection to obtain positioning estimation results

ONLINE

OFFLINE

S202 Generating 2D/3D map

S204 Defining TRPs location in map

S206 Initialization and pre-processing of TRPs

FIG. 2

Simulated TRPs

| TRP Group Index | TRP ID |
|---|---|
| 0 | 0,1,2,3,4,13,15 |
| 1 | 4,6,8,10,11,13 |
| 2 | 13,15,16,17 |
| 3 | 11,13,19,21 |
| 4 | 0,2,6,8,10,11,16,19,21 |
| 5 | 0,2,4,13,15,16,17,19 |
| 6 | 4,6,8,10,11,13,19,21 |

● Enabled TRP    ● Disabled TRP

FIG. 10

SYSTEM AND METHOD USING 5G POSITIONING WITH NON-LINE OF SIGHT INFORMATION FROM SENSORS UTILIZING TRANSMISSION AND RECEPTION POINTS AND SOUNDING REFERENCE SIGNALS

TECHNICAL FIELD

The present invention relates to wireless communication and sensor perception technologies; and in particularly to systems and methods using 5G positioning with non-line of sight information from sensors for enhancing positioning accuracy.

BACKGROUND

High-accuracy positioning is a prerequisite for many advanced location-based services in future mobile networks. Providing position information with sufficient accuracy, high efficiency, and wide coverage can help optimize and automate processes in various vertical sectors, ranging from autonomous driving to the Industrial Internet of Things (IoT). The radio equipment in 5G New Radio (5G NR) networks needs a more accurate positioning method to meet the NR positioning requirements for regulatory and commercial applications. In Release 16 for 5G technology, the LTE positioning feature is extended to accommodate enablers of 5G, such as wideband signals, low latency, and a flexible architecture.

In real scenarios, multipath problems exist, and non-line of sight (NLOS) occurs all the time due to blockage from known structural objects on the map or from dynamic obstacles like humans. Specifically, in ideal cases, all transmission reception points (TRPs) have a line of sight (LOS) path to the user equipment (UE), resulting in high positioning precision. In non-ideal cases, if there are only NLOS paths between some TRPs and UE, positioning precision will be compromised. For LOS, the peak with the largest power is the peak of the first path arrival, making it trivial. For NLOS, the peak of the first path arrival is a hidden peak, which is hard to find. Multipath problems and NLOS are challenging to determine, worsening 5G positioning accuracy, due to the hidden peak in the power of the channel impulse response.

Therefore, there is a need to develop a system and a method for enhancing positioning precision and thus effectively improving location accuracy based on 5G NR Release 16 reference signals and reducing computational complexity.

SUMMARY OF INVENTION

It is an objective of the present invention to provide systems and methods to address the aforementioned shortcomings and unmet needs in the state of the art.

In accordance with a first aspect of the present invention, a system using 5G positioning with NLOS is provided. The system includes a plurality of TRPs, a UE with sensors, and a backend server. The TRPs are distributed in a target region. The UE is placed within the target region and is electrically coupled with the TRPs. The UE comprises at least one sensor for gathering surrounding information at the target region. The backend server is electrically coupled with the TRPs and comprises a signal receiver, a positioning module, a signal emitter, and a feedback module. The signal receiver is configured to receive first sounding reference signals (SRSs) from the UE through the TRPs. The positioning module is configured to compute a preliminary location of the UE within the target region according to the first SRS signals. The signal emitter is configured to send a location signal containing the preliminary location of the UE to the UE through the TRPs. The feedback module is configured to receive second SRSs and NLOS information from the UE and to generate at least one positioning estimation result by positioning the UE in response to the second SRSs in combination with the NLOS information.

In accordance with a second aspect of the present invention, a system using 5G positioning with NLOS information is provided. The system includes a plurality of TRPs and a backend server. The TRPs are distributed in a target region and electrically coupled with a UE. The backend server is electrically coupled with the TRPs and comprises a signal receiver, a positioning module, a signal emitter, and a feedback module. The signal receiver is configured to receive first SRSs from the UE through the TRPs. The positioning module is configured to compute a preliminary location of the UE within the target region according to the first SRS signals. The signal emitter is configured to send a location signal containing the preliminary location of the UE to the UE through the TRPs. The feedback module is configured to receive second SRSs and NLOS information from the UE and to generate at least one positioning estimation result by positioning the UE in response to the second SRSs in combination with the NLOS information.

In accordance with a third aspect of the present invention, a system using 5G positioning with NLOS information is provided. The system includes a signal receiver, a positioning module, a signal emitter, and a feedback module. The signal receiver is configured to receive first SRSs. The positioning module is configured to compute a preliminary location in a map with respect to an object according to the first SRS signals. The signal emitter is configured to send a location signal containing the preliminary location of the object. The feedback module is activated by the signal emitter upon sending the location signal and is configured to receive second SRSs and NLOS information and to generate at least one positioning estimation result by positioning the object in response to the second SRSs in combination with the NLOS information.

Through the embodiments of the present invention, the positioning process can be achieved with high accuracy and simplified, resulting in a notable reduction in power consumption. By incorporating reliability or reweight values in the positioning determination, the operation effectively mitigates unpredictable risks associated with positioning estimation results arising from low-quality received signals.

BRIEF DESCRIPTION OF DRAWINGS

Embodiments of the invention are described in more details hereinafter with reference to the drawings, in which:

FIG. 2 depicts a process flowchart of a method using 5G positioning with non-line of sight information according to one embodiment of the present invention;

FIG. 10 depicts a process flowchart of the feedback module executing the first arrival path (FAP) estimation and the relative time of arrival (RTOA) according to one embodiment of the present invention;

DETAILED DESCRIPTION OF THE INVENTION

In the following description, systems and methods using 5G positioning with non-line of sight information and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In the present disclosure, the terms "electrically coupling" and "electrically coupled" encompass both wired electrical and optical connections (coupled/coupling) and wireless radio connections (coupled/coupling), facilitating the transfer or exchange of data or signals. For instance, when stating that element A is electrically coupled to/with element B, it signifies that element A can communicate with element B, facilitating the transfer or exchange of data or signals. Another example is when element C is electrically coupled to/with element D, it denotes that element C can emit a signal, and element D can receive the same. The term "data/signal" encompasses various forms such as 5G communication radio waves, analog and digital data in data and metadata communication, machine control triggering, and so forth.

Figure 1:
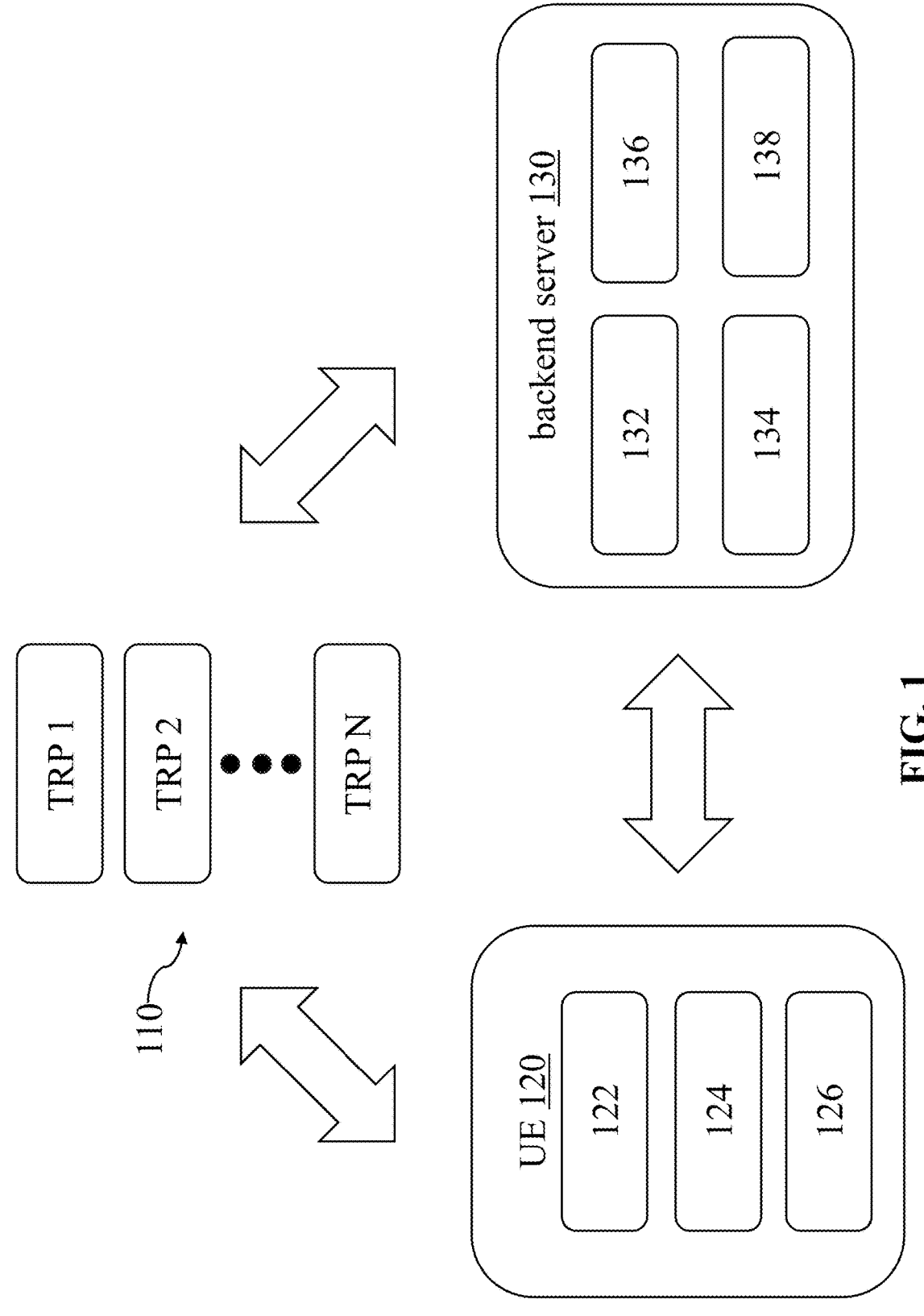
FIG. 1 depicts a schematic diagram of a system using 5G positioning with non-line of sight information according to one embodiment of the present invention.

Referring to FIG. 1 for the following description. The system 100 using 5G positioning with NLOS information includes a plurality of transmission and reception points (TRPs) 110, a user equipment (UE) 120, and a backend server 130, which are electrically coupled with each other (i.e., which can electrically communicate with each other).

The TRPs 110 can be distributed across a target region, including indoor/outdoor environments, warehouses, or factories, and the UE 120 is positioned within the target region. The backend server 130 can establish a wireless connection with the TRPs 110 and UE 120, offering flexibility in installation, such as setting in the cloud, at a remote site, on any workstation, or even on handheld electronic devices.

The backend server 130, in collaboration with the TRPs 110, collectively executes a positioning method (e.g., 5G positioning) to determine the location of the UE 120 within the target region. Such the method, as illustrated in the flowchart depicted in FIG. 2, aims to simplify the complexity of the positioning process, consequently leading to reduced power consumption. The method includes steps S202, S204, S206, S208, S210, S212, S214, and S216, with steps S202-S206 being executable offline, and steps S208-S216 being online.

Figures 3, 4:
FIG. 3 depicts a 2D/3D HD map of an indoor/outdoor environment according to one embodiment of the present invention.
FIG. 4 depicts a schematic diagram illustrating the defining of TRP locations, including coordinates in (x, y, height), in the HD map as depicted in FIG. 3.

In step S202, it is to generate/obtain 2D/3D HD map of an indoor/outdoor environment, as shown in FIG. 3. For example, a 2D HD map is developed utilizing a mobile robot equipped with a 360° 2D LiDAR positioned 0.7 meters above ground level, along with optional sensors, such as an inertial measurement unit (IMU). In one embodiment, all sensor data is systematically gathered and timestamped, then is stored on an onboard PC. Subsequently, an offline mapping program is employed to generate a high-definition map (e.g., being with a resolution of 5 cm).

In one embodiment, the 2D HD map is a grayscale image in which each pixel's value ranges from 0 to 255 as an integer, representing the level of blockage/obstacles in the corresponding physical space. A pixel value of zero represents 100% blockage/obstacles like walls, a pixel value of 255 represents 100% free space, and a pixel value of 128 represents unknown space. The 2D map provides a top-down bird's-eye view of the physical world, disregarding the height factor, essentially functioning as a floor map. Each pixel represents a physical space no larger than 5 cm×5 cm, meaning the 2D HD map resolution is 5 cm or less. In one embodiment, the 3D HD map is a map consisting of dense and evenly distributed 3D point clouds. Each point may also carry intensity information ranging from 0 to 255 as an integer, representing the level of reflectivity of the object surface. To qualify as an HD map, the separation between points must be less than 5 cm for a range of 50 m×50 m.

In one embodiment, professional 2D/3D scanning equipment and corresponding software, such as the Leica RTC360 and Leica Cyclone software, are utilized to construct a map. In another embodiment, mobile robots/drones equipped with high-grade sensors are employed. Further, these mobile robots/drones are configured to execute the SLAM algorithm. For example, to create a 2D HD map, a robot equipped with Pepperl-fuchs R2000 LiDAR is employed, and SLAM is performed using Google® Cartographer. To construct a 3D HD map, a robot with Velodyne HDL-64E is used, and SLAM is executed with LIO-SAM. For outdoor mapping, GNSS and RTK devices can also be employed to ensure absolute location accuracy up to 1.5 cm.

In step S204, it is to define the TRP locations, including coordinates in (x, y, height), in the HD map, as shown in FIG. 4. In one embodiment, the physical locations of all TRPs 110 are aligned with the HD map coordinate system via manual calibration. As illustration in FIG. 4, there is simulation of an indoor warehouse environment, where simulated TRPs are mounted at the ceiling as illustrated in spheres.

Figure 5:
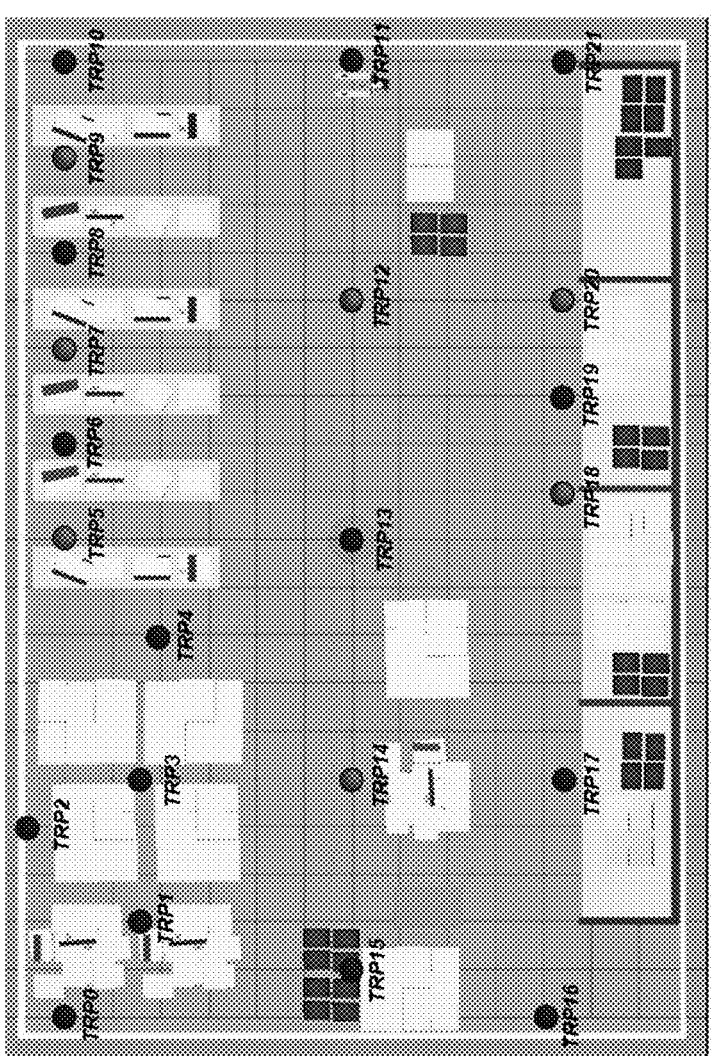
FIG. 5 depicts a schematic diagram illustrating the initialization and pre-processing of TRPs according to one embodiment of the present invention.

In step S206, the initialization and pre-processing of TRPs are preformed, as shown in FIG. 5. In one embodiment, the initialization of TRPs includes determining which TRPs are used for positioning in this scenario. To align more closely with actual scenarios, an optimal number of TRPs can be selected as enabled TRPs based on their respective locations. These TRPs are then pre-grouped to enhance the accuracy of the time difference of arrival (TDOA) solution. TRPs that are not selected for this step are identified as disabled TRPs. In one embodiment, the optional pre-processing of TRPs includes pre-group the TRPs based on pre-defined/pre-configured environment information.

In step S208, the backend server 130 computes a rough positioning result (e.g., rough 5G positioning) to the UE 120 as initial guess, such as $(x_0, y_0, 0)$ in the HD map. Specifically, the backend server 130 includes a signal receiver 132, a positioning module 134, and a signal emitter 136. The signal receiver 132 is configured to receive first sounding reference signals (SRSs) from the UE 120 (the sensors of the UE 120) through the TRPs 110 and pass it to the positioning module 134, and then the positioning module 134 can compute a preliminary location of the UE 120 within the target region according to the first SRS signals. Thereafter, the signal emitter 136 sends a location signal containing the preliminary location of the UE 120 to the UE 120 through the TRPs 110. In one embodiment, the computed rough positioning result as the initial guess can attain less than 3 m positioning error for the UE 120 in indoor deployment.

In step S210, the UE 120 can gather surrounding information at the target region through equipped one or more sensors 122. In one embodiment, the sensor 122 of the UE 120 comprises at least one 3D-LiDAR, at least one 2D-LiDAR, at least one color camera, at least one stereo camera, at least one depth camera, at least one inertial measurement unit (IMU), at least one e-compass, or combinations thereof. Expressed differently, although a 2D-LIDAR is employed in the embodiment as illustrated, alternative embodiments allow for its substitution with 3D-LiDAR, color camera, stereo camera, depth camera, IMU, e-compass, or their individual or combinative configuration. The color camera can detect obstacles and walls by semantic classification; the stereo and depth camera can detect obstacles and walls by depth images; the 2D and 3D LiDARs can detect obstacles and walls by distance of 2D/3D point clouds. For the simulation results, a 3D-LiDAR with the following parameters can be used, including: Field of view (vertical): 60° (+30° to −30°); Angle resolution (vertical): 1°; Field of view (horizontal): 360°; Angle resolution (horizontal): 1°; Maximum working distance: 120 m; Smallest working distance: 10 cm; Frame rate: 30 Hz; and Distance accuracy:<1 cm. Furthermore, the magnetometer in 9-axis IMU or the e-compass in the UE 120 can be used as well, such that an approximated global orientation $\theta_G$ of the UE 120 can be obtained, which is relative to Magnetic north.

In step S212, the UE 120 can compute the probability of Line-of-sight (LOS) for each of the TRPs 110 according to initial guess $(x_0, y_0, 0)$ and the surrounding information in the HD map. Briefly, the UE 120 further includes a NLOS probability calculator 124 configured to compute a probability of LOS for each of the TRPs 110 in a digital map that represents the target region, according to the surrounding information and the preliminary location of the UE 120, thereby generating the NLOS information. The purpose of step S212 is to generate Non-Line of Sight (NLOS) information, which can be sent back to the backend server 130 to assist in enhancing positioning accuracy. More details regarding this feature are provided as follows.

The HD map has its global orientation $\theta_M$ calibrated during offline mapping stage (i.e., steps S202 to S206), so $\theta_M$ is the angle between the HD map X-axis and the Magnetic north. Thus, the approximated orientation of the UE 120 relative to the HD map can be obtained, that is $\theta_U := \theta_G - \theta_M$. Under the assumption that the UE 120 is on the ground and moves parallel to the ground, the full pose of the UE 120 relative to the HD map can be expressed as: $(x_0, y_0, 0, 0, 0, \theta_U)$ under the full pose expression (X, Y, Z, Roll, Pitch, Yaw).

The next operation involves the transformation for different coordinate systems. The UE 120 further comprises a coordinate transformation module 126 configured to transform coordinates of data points within the target region collected from the surrounding information. Herein, the data points within the target region refers to objects/targets (e.g., TRPs 110 or obstacles) detected and collected by the sensors 122 of the UE 120 in step S210, and the coordinates of the data points are transformed by the coordinate transformation module 126 so as to further define the probability of LOS to all TRPs 110.

The coordinate transformation module 126 is configured to convert data points (e.g., 3D-LiDAR data points) from LiDAR coordinate system to Robot (i.e., the UE 120) coordinate system, and finally to the map coordinate system.

In one embodiment, the 3D LiDAR is mounted in a way that the x-axis (i.e., front) of the LiDAR is parallel to the x-axis of the UE 120 (i.e., driving direction); it is to assume the mounting error is zero, and thus it is purely a translation transformation as follows:

$$\begin{bmatrix} X_{UE} \\ Y_{UE} \\ Z_{UE} \end{bmatrix} = \begin{bmatrix} X_{Lidar} \\ Y_{Lidar} \\ Z_{Lidar} \end{bmatrix} + \begin{bmatrix} X_T \\ Y_T \\ Z_T \end{bmatrix}$$

where $X_T$, $Y_T$ and $Z_T$ are the translation in meters between the 3D LiDAR coordinate system and the UE coordinate system, which can be estimated via manual measurements.

To simplify, assume that the UE coordinate system shares the same z-plane as that of the map coordinate system, the transformation can be represented as follows:

$$\begin{bmatrix} X_{Map} \\ Y_{Map} \\ Z_{Map} \end{bmatrix} = \begin{bmatrix} X_{UE} \\ Y_{UE} \\ Z_{UE} \end{bmatrix} \begin{bmatrix} \cos(\theta_U) & -\sin(\theta_U) & 0 \\ \sin(\theta_U) & \cos(\theta_U) & 0 \\ 0 & 0 & 1 \end{bmatrix} + \begin{bmatrix} X_0 \\ Y_0 \\ 0 \end{bmatrix}$$

Figure 6:
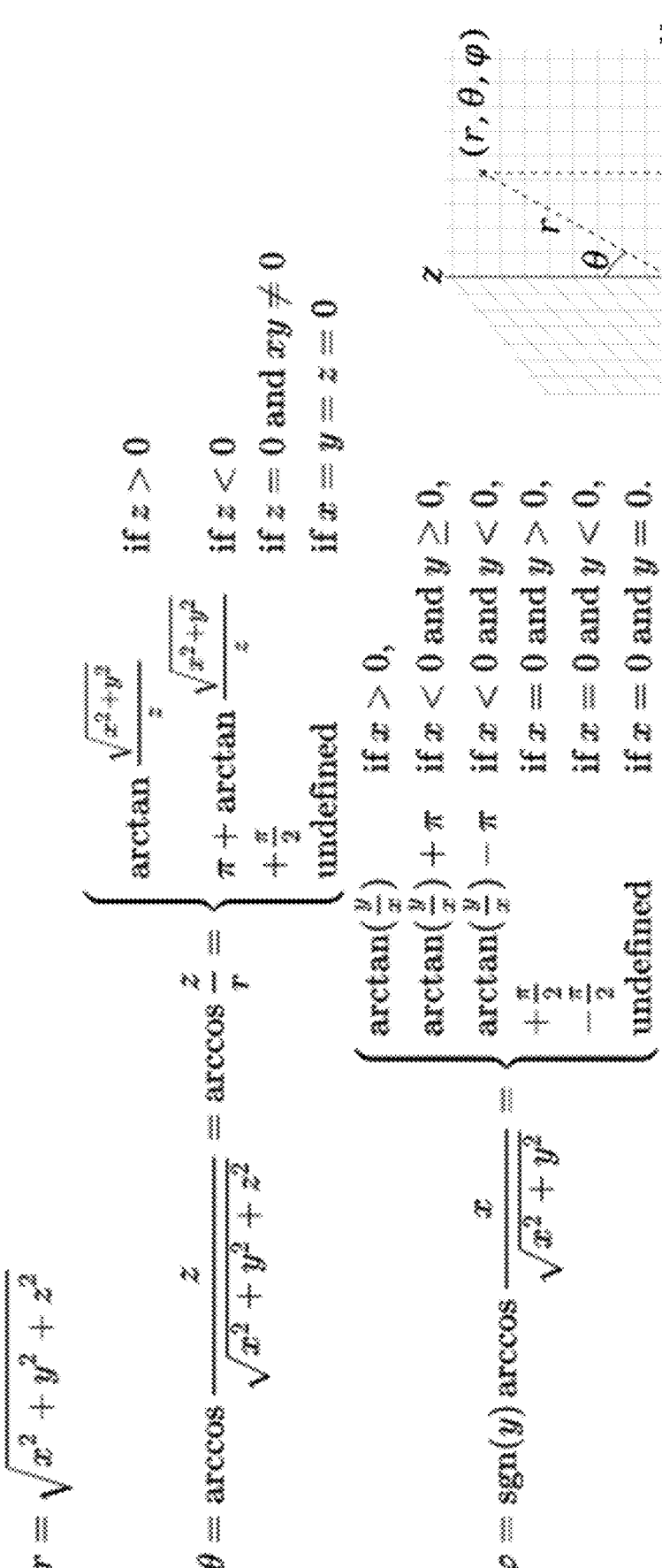
FIG. 6 shows the formula for coordinate transformation according to one embodiment of the present invention.

The coordinate transformation module 126 of the UE 120 can then convert 3D-LiDAR data points (i.e., in map coordinate) from Euclidean coordinates to spherical coordinate representation by the formula shown in FIG. 6.

Figures 7, 8:
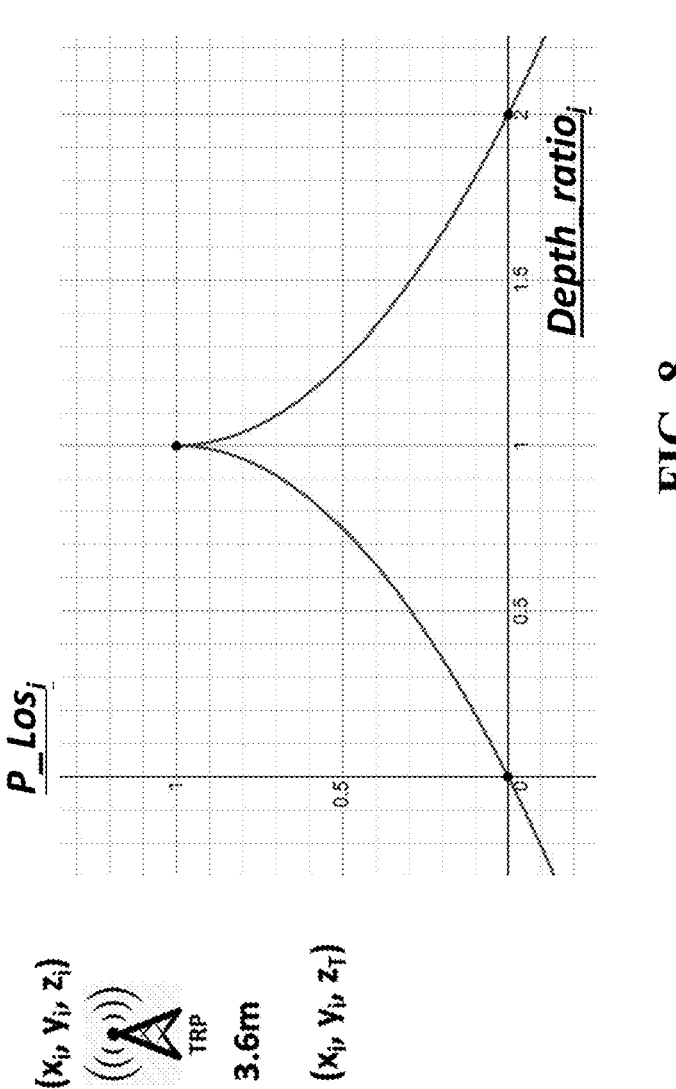
FIG. 7 depicts an illustration of ray-tracing with various parameters according to one embodiment of the present invention.
FIG. 8 depicts an exemplary graph of probability of LOS to TRPs parameters according to one embodiment of the present invention.

The coordinate transformation module 126 of the UE 120 can be configured to build a dictionary Dict[(θ, φ)]=r using all converted 3D-LiDAR points P(r, θ, φ). This serves as a pre-processing step for the subsequent ray-tracing works as shown in FIG. 7. For each TRP $(x_i, y_i, z_i)$ where i is the index of the TRP, the coordinate transformation module 126 of the UE 120 computes the corresponding ray-tracing angle tuple $(\theta^i, \varphi^i)$ and GT_length$_i$ from the initial guess $(x_0, y_0, 0)$, which may be represented by the following formula:

$$\varphi^i = \arctan\left(\frac{y_i - y_0}{x_i - x_0}\right) \qquad \text{[horizontal angle]}$$

-continued $$\theta^i = \arctan\left(\frac{Z_i - ZT}{\sqrt{(x_i - x_0)^2 + (y_i - y_0)^2}}\right) \quad \text{[vertical angle]}$$

$$GT\_length_i = \sqrt{(x_i - x_0)^2 + (y_i - y_0)^2 + (Z_i - Z_T)^2}$$

where, in one embodiment, $Z_i$=Ceiling height=3.6 m for simplification, and $Z_T$=height of 3d-LiDAR above the ground as defined.

For each $(\theta^i, \varphi^i)$, $GT\_length_i$, where i is the index of the TRPs 110, the coordinate transformation module 126 of the UE 120 can look into the dictionary $Dict[(\theta, \varphi)]=r$ built in the afore-mentioned processing, to find the parameter "r".

A programming code can be defined and stored in the NLOS probability calculator 124 of the UE 120, which is $Depth\_ratio_i:=Dict[(\theta^i, \varphi^i)]/GT\_length_i$. Assuming that the 3D-LiDAR points are distributed evenly and densely, for any $(\theta, \varphi)$, a key in the dictionary can be found. Then, the NLOS probability calculator 124 of the UE 120 can define and build a model of probability of LOS to $TRP_i$ (i.e., the TRPs 110 in the target region is:

$$P\_Los_i := 1 - |Depth\_ratio - 1|^{\frac{1}{2}},$$

which is plotted in FIG. 8, where the probability equals zero for a negative result). In this regard, the probability of "0" represents that the LOS from the UE 120 to the target TRP 110 is 100% blocked; and the probability of "1" represents that the UE 120 and the target TRP are within LOS. Therefore, the UE 120 is capable of computing probability of LOS for each of TRPs and packaging this result as NLOS information.

Figure 9:
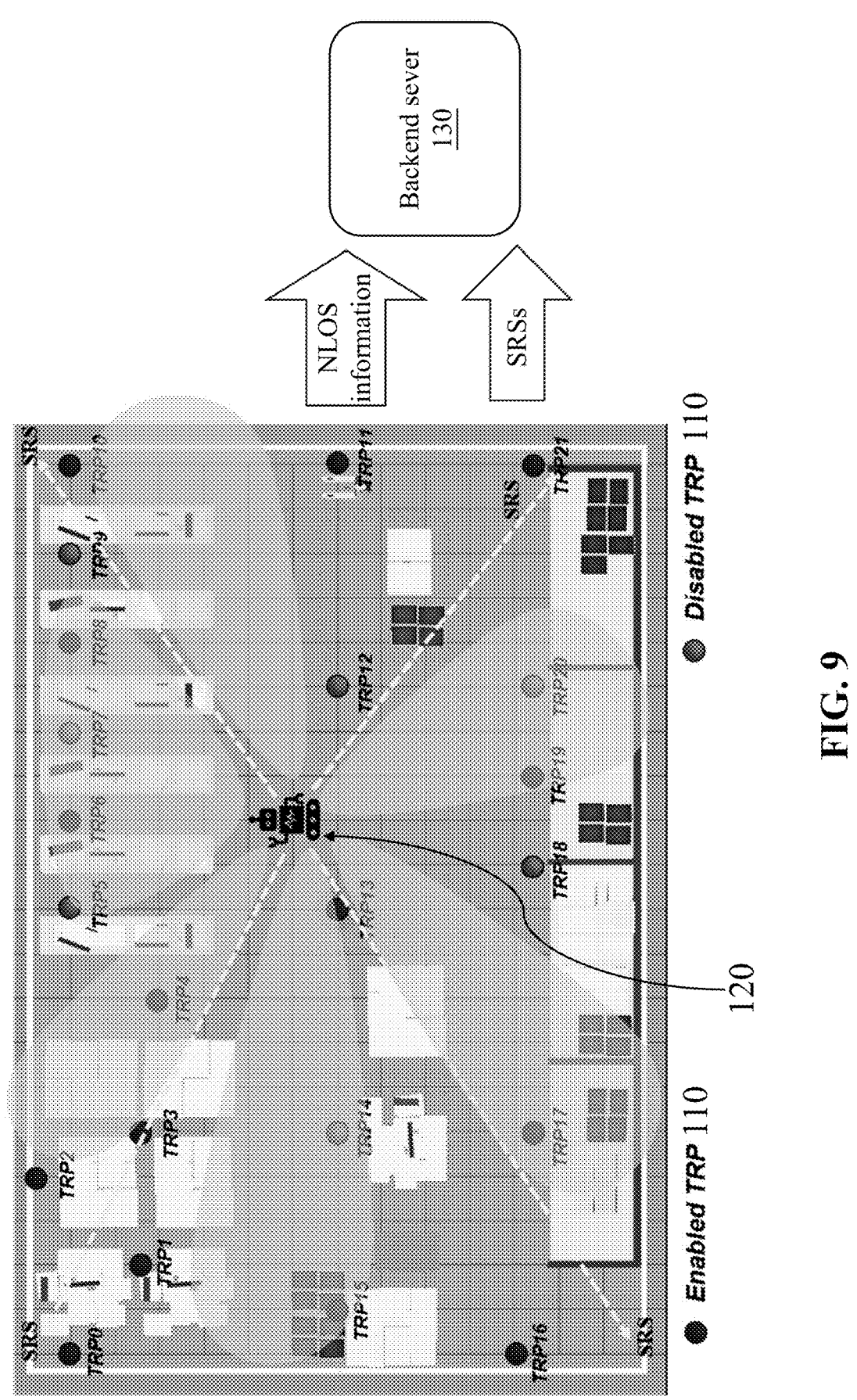
FIG. 9 depicts an illustration of step S214 of the method according to one embodiment of the present invention.

In step S214, as illustrated in FIG. 9, the UE 120 transmits a second SRSs and provide the NLOS information to the backend server 130 via the TRPs 110 for further positioning. In one embodiment, the UE 120 transmits pre-configured SRSs (the second SRSs) by slot for positioning and sends the NLOS information for each of the enabled TRPs 110 to the backend server 130 via the TRPs 110 or via direct communication (e.g., via Bluetooth). In one embodiment, the backend server 130 includes a feedback module 138 configured to receive the second SRSs and the NLOS information from the UE 120, which may be directly sent by the UE 120 or sent via the TRPs 110. The feedback module 138 processes the second SRSs and the NLOS information from the UE 120, which means it is activated upon sending the location signal by the signal emitter in step S208, so as to avoid mis-processing signals. The feedback module 138 aims to generate at least one positioning estimation result by positioning the UE 120 in response to the second SRSs in combination with the NLOS information. In various embodiments, the feedback module 138 may comprise separate and distributed components that are electrically connected. These components may be implemented by hardware, software, and combinations thereof.

Figure 10:
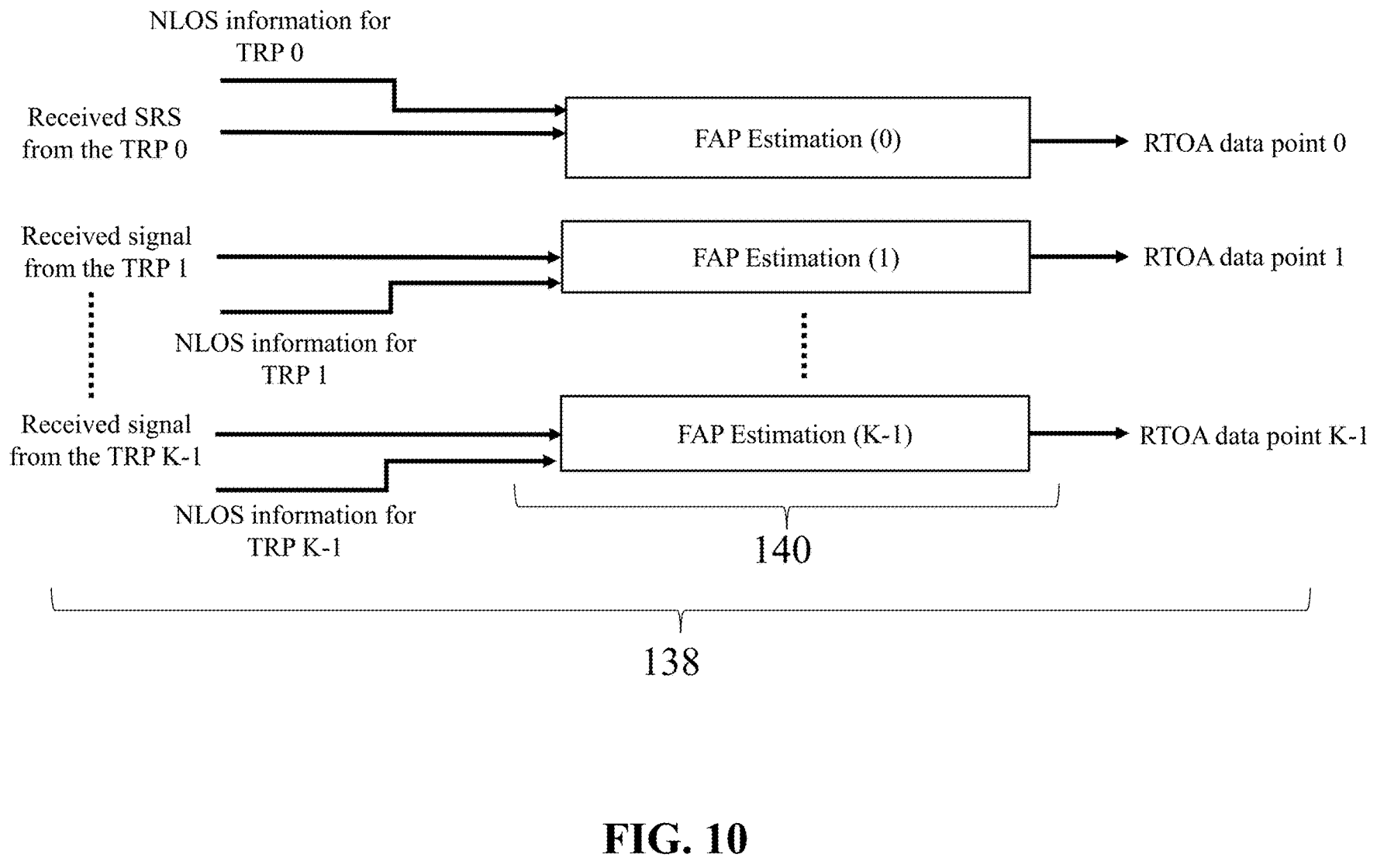

Referring to FIG. 10 for the following description. In step S216, it aims to use positioning (e.g., 5G positioning) with the NLOS information from the sensors 122 of the UE 120 for FAP estimation and RTOA selection to obtain positioning estimation result, which is labeled "RTOA data point." The feedback module 138 includes a FAP estimator 140 and is further configured to incorporate the NLOS information (i.e., NLOS information for TRP 0, 1 . . . K−1, where K is a positive integer) and the second SRSs (i.e., Received SRS from the TRP 0, 1 . . . K−1) into the FAP estimator 140, so as to estimate RTOA data points (i.e., RTOA data point 0, 1 . . . K−1). In one embodiment, after obtaining the RTOA data points, the feedback module 138 can collect these data points and generate at least one positioning estimation result for the UE 120 by using positioning algorithm, such TDOA.

Figures 11, 12:
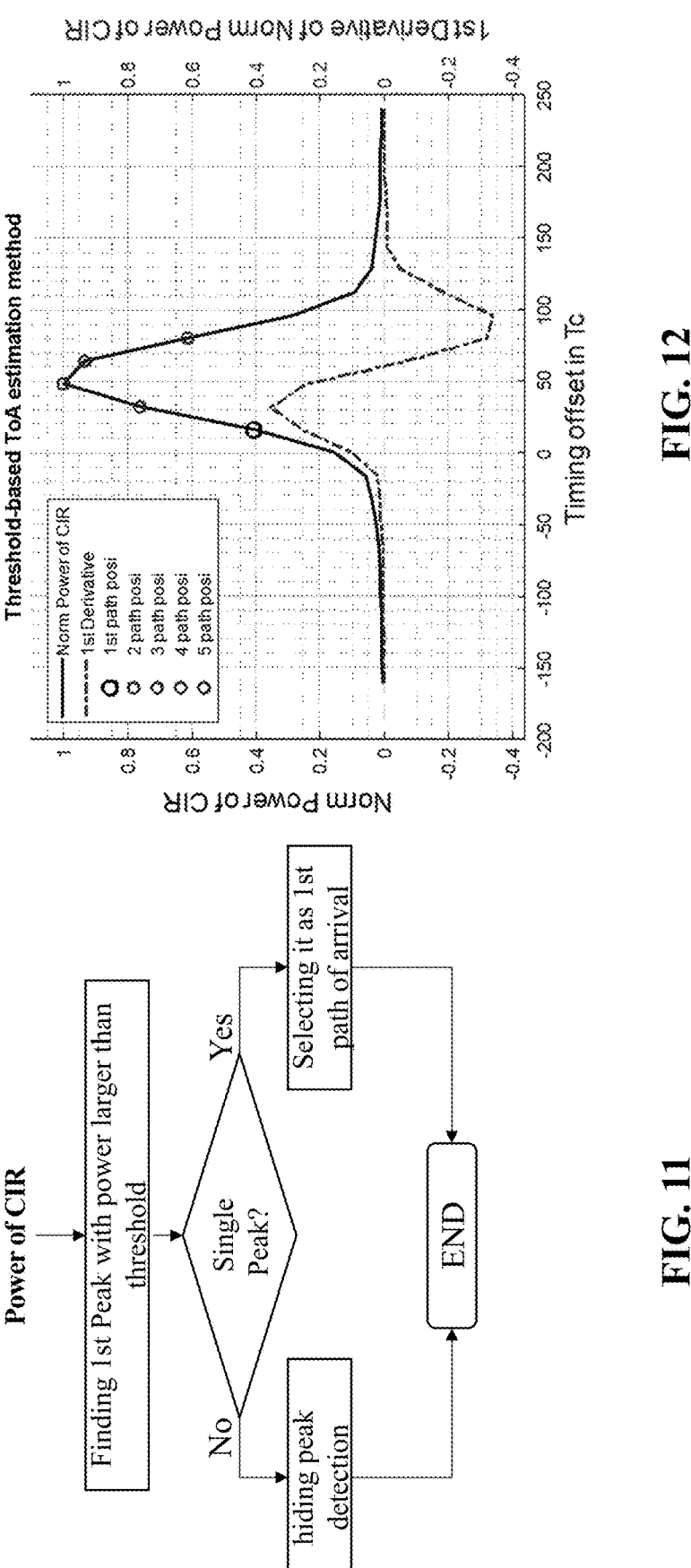
FIG. 11 depicts a process flowchart of the timing offset identification of a first peak in target power by the FAP estimator according to one embodiment of the present invention.
FIG. 12 depicts a data graph of a time domain correlation result according to one embodiment of the present invention.

The FAP estimator 140 executes the FAP Estimation (0), (1), . . . (K−1) by identifying the timing offset of the first peak in target power. Referring to FIG. 11 and FIG. 12, the FAP estimator 140 extracts the power of channel impulse response (CIR) from the received signals to find or identify the timing offset of the first peak with power larger than threshold (e.g., a pre-defined threshold). This operation can be run during time of arrival (TOA) estimation conducted by the FAP estimator 140.

For example, for $TRP_i$, the received signal's power of CIR denoted by $C_i(n)$, the single peak detection processing based on the $C_i(n)$, predefined threshold $\varphi_i$ and NLOS probability $P_{NLOS,i}$ can be expressed as:

$$IsSingle_i=f(C_i(n),\varphi_i,P_{NLOS,i}),$$

where $f( )$ is the function w.r.t single peak decision processing in FAP estimation used in positioning.

If $IsSingle_i$ is TRUE, the FAP estimator 140 determines the estimated TOA to be $\tau_{i,max}$ corresponding max value of $C_i(n)$.

If $IsSingle_i$ is FALSE, the FAP estimator 140 can run hidden peak detection processing to find hidden peak's TOA belongs to $[0,\tau_{i,max}]$.

In this regard, in FIG. 10, the single peak decision result approaches "FALSE" by using the NLOS information as adjustment factors, so the estimated TOA point is closer to correct point (i.e., being closer to actual situations). As such, using the NLOS information in timing of the FAP estimator 140 can improve the accuracy of estimated TOA value.

Figure 13:
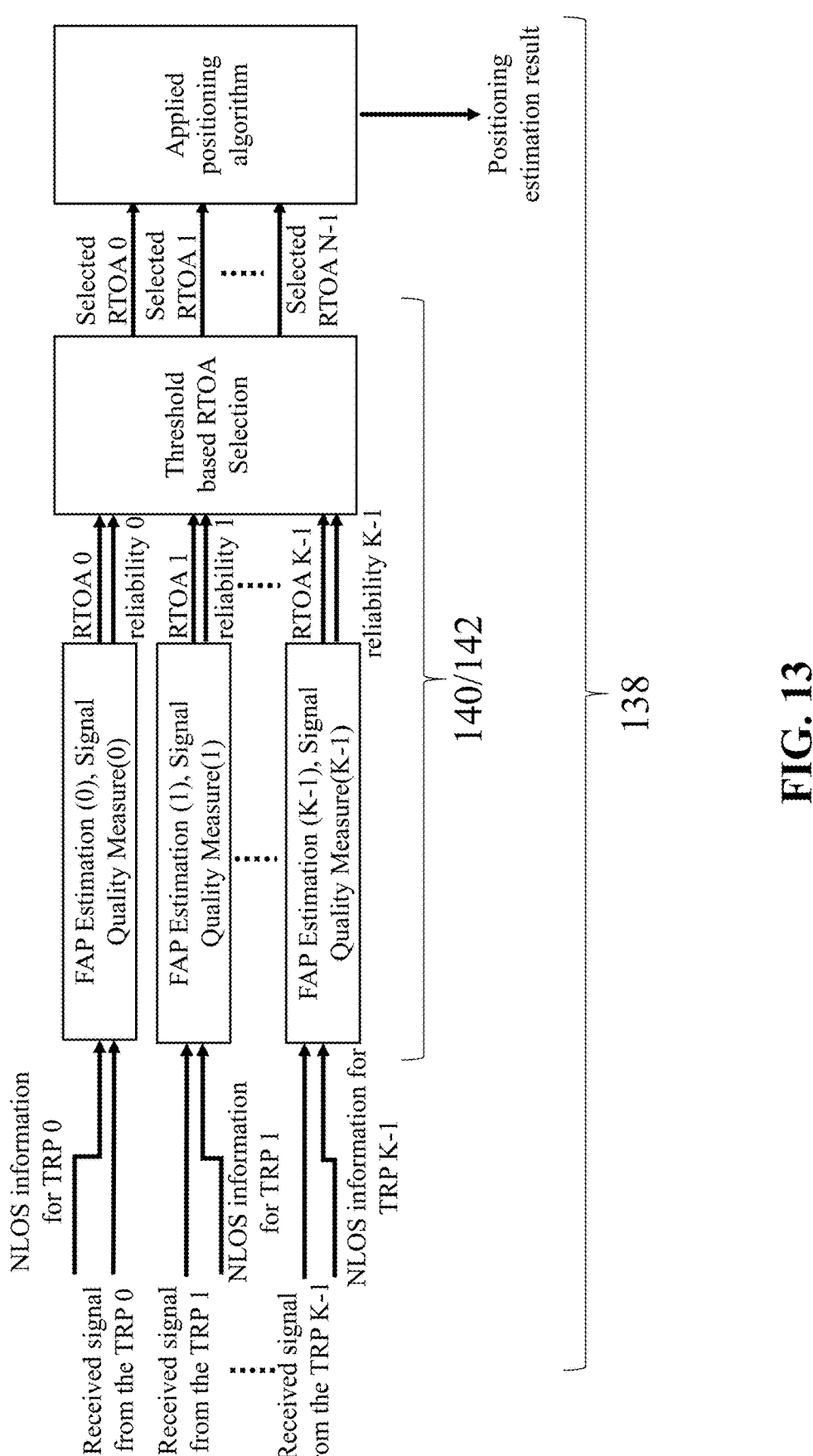
FIG. 13 depicts a process flowchart of the feedback module executing the FAP estimation and the RTOA selection by a signal quality measurer thereof to obtain positioning estimation result according to one embodiment of the present invention.

Referring to FIG. 13 for the following description. In step S216, in one embodiment, the corresponding reliability value based on the signal quality of the received SRS can be calculated, eliminating the low reliability result and thus improving the positioning accuracy.

Specifically, the feedback module 138 includes a signal quality measurer 142 and is further configured to incorporate the second SRSs (i.e., Received SRS from the TRP 0, 1, . . . K−1) into the signal quality measurer 142. The signal quality measurer 142 can work collectively with the FAP estimator 140 for calculating reliability for the RTOA data points (i.e., RTOA 0, 1, . . . K−1) by using measured signal quality of the corresponding second SRS. Each of the produced RTOA data point accompanies reliability (i.e., reliability 0, 1, . . . K−1). Then, the signal quality measurer 142 performs threshold based RTOA selection, so as to eliminate the RTOA data points which have reliability lower than a pre-defined threshold. Thereafter, the feedback module 138 can calculate the positioning estimation result using the remaining RTOA data points (i.e., Selected RTOA 0, 1, . . . N where Nis a positive integer less than K) with the FAP estimator 140 and the signal quality measurer 142 collectively via a positioning algorithm. In one embodiment, the signal quality measurer 142 determines whether to eliminate the target RTOA data point according to its received signal strength indicator (RSSI), reference signal received power (RSRP), signal-to-noise ratio (SNR), and reference signal received path power (RSRPP) of the corresponding second SRS and further according to the NLOS information. The reason for introducing signal quality is that the corresponding reliability values may become low in the presence of NLOS conditions. The illustration in FIG. 13 aims to use a threshold to eliminate these RTOA data points before running the positioning algorithm, which can save computational resources and improve positioning accuracy.

Figure 14:
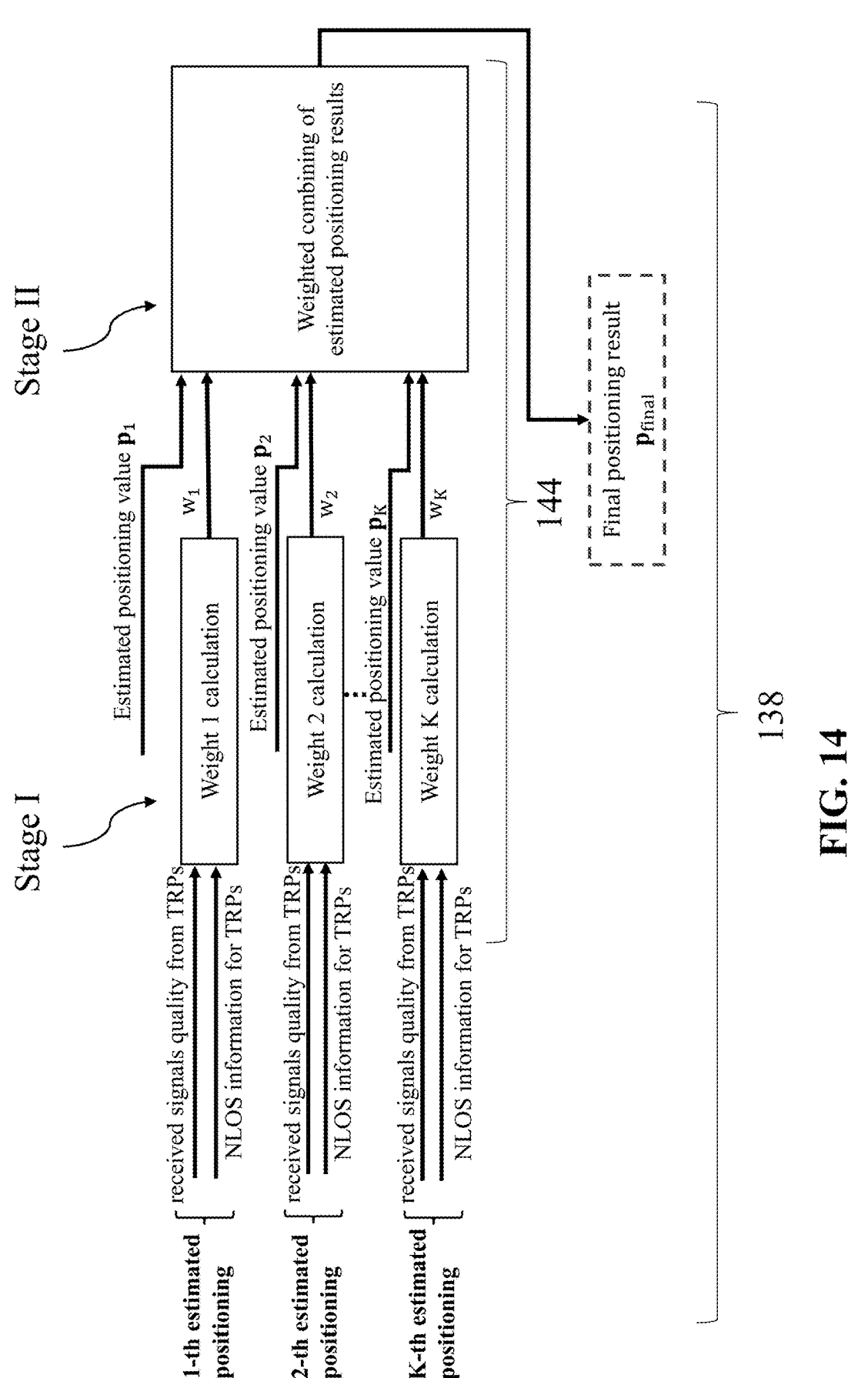
FIG. 14 depicts a process flowchart of the feedback module calculating a final positioning result by using positioning estimation results and respective weights according to one embodiment of the present invention.

Referring to FIG. 14 for the following description. The feedback module 138 may further include a signal weight assignment module 144 and incorporate positioning estimation results into the signal weight assignment module 144 for calculating weights for the positioning estimation results according to signal quality.

The multiple positioning estimation results (i.e., $1^{th}$ estimated positioning, $2^{th}$ estimated positioning . . . $K^{th}$ estimated positioning) can be obtained based on the pre-defined groups of the TRPs 110 with estimating the UE location with the positioning algorithm. Weight values based on the signal quality from the TRPs 110 or the UE 120 (e.g., RSSI/RSRP/ SNR/RSRPP of the second SRSs or the NLOS information) which are used for determining the positioning estimation results can be calculated, and, after normalization operation, the respective weight values are combined with the positioning estimation results for determining a final positioning result.

FIG. 14 depicts an illustration of Stage I and Stage II. Stage I comprises constructing weight value from the signal quality and the NLOS information; and Stage II comprises enhancing the positioning estimation results from high received signals quality/NLOS probability and weakening the positioning estimation results from low received signals quality/NLOS probability.

In Stage I, it is assumed the positioning estimation results $p_i(i,=1, 2, . . . , K)$, for any three TRPs 110, can be obtained by using the TDOA as afroed-mentioned. Accordingly, following the previous operation, every three TRPs 110 can have corresponding NLOS information $P_{NLOS,i}$ and measure three signal quality (e.g., RSSI), which can be brought into a weight function:

$$f(RSSI_{i1},RSSI_{i2},RSSI_{i3},P_{NLOS,i1},P_{NLOS,i2},P_{NLOS,i3}),$$

where $f(\ )$ is the function w.r.t signal quality of SRSs from TRPs and NLOS information for TRPs used in positioning. In one embodiment, weight function $f(RSSI_{i1}, RSSI_{i2}, RSSI_{i3}, P_{NLOS,i1}, P_{NLOS,i2}, P_{NLOS,i3})$ is equal to:

$$\frac{RSSI_{i1} * (1 - P_{NLOS,i1}) + RSSI_{i2} * (1 - P_{NLOS,i2}) + RSSI_{i3} * (1 - P_{NLOS,i3})}{3}$$

Then, the weight values are normalized as follows:

$$w_i = normalize(f(RSSI_{i1},RSSI_{i2},RSSI_{i3},P_{NLOS,i1}, P_{NLOS,i2},P_{NLOS,i3}))$$

In stage II, the weight values are assigned into the corresponding positioning estimation results to obtain final result, by using:

$$p_{final} = \sum_{i=1}^{K} w_i p_i$$

As such, with weight values introduced into the determination for the final positioning result, it can reduce unpredictable risks in the positioning estimation results from low received signals quality and the NLOS information.

Upon obtaining the positioning estimation result or the final positioning result, the signal emitter 136 can be configured to send the positioning estimation result or the final positioning result to a user interface for representing a modified location of the UE 120 with respect to the preliminary location thereof. For example, the user interface can list the computing or modifying history for the positioning (i.e., the preliminary location of the UE 120 and the positioning location after referring to the NLOS information) via a screen or a dashboard.

The functional units and modules of the apparatuses and methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A system using 5G positioning with non-line of sight information, comprising:

a plurality of transmission and reception points (TRPs) distributed in a target region;

a user equipment (UE) placed within the target region and electrically coupled with the TRPs, wherein the UE comprises at least one sensor for gathering surrounding information at the target region; and a backend server electrically coupled with the TRPs and
comprising:

a signal receiver configured to receive first sounding
reference signals (SRSs) from the UE through the
TRPs;

a positioning module configured to compute a prelimi-
nary location of the UE within the target region
according to the first SRS signals;

a signal emitter configured to send a location signal
containing the preliminary location of the UE to the
UE through the TRPs; and a feedback module configured to receive second SRSs
and non-line of sight (NLOS) information from the
UE and to generate at least one positioning estima-
tion result by positioning the UE in response to the
second SRSs in combination with the NLOS infor-
mation.

2. The system according to claim 1, wherein the sensor of
the UE comprises one or more of a 3D-LiDAR, a 2D-Li-
DAR, a color camera, a stereo camera, a depth camera, an
inertial measurement unit (IMU), an e-compass, and com-
binations thereof.

3. The system according to claim 1, wherein the UE
further comprises a NLOS probability calculator configured
to compute a probability of line of sight (LOS) for each of
the TRPs in a digital map which represents the target region
according to the surrounding information and the prelimi-
nary location of the UE, thereby generating the NLOS
information.

4. The system according to claim 1, wherein the UE
further comprises a coordinate transformation module con-
figured to transform coordinates of data points within the
target region collected from the surrounding information.

5. The system according to claim 1, wherein the feedback module comprises a first arrival
path (FAP) estimator; and wherein the feedback module is further configured to
incorporate the NLOS information into the FAP esti-
mator to estimate relative time of arrival (RTOA) data
points by identifying a timing offset of the first peak in
power of channel impulse response (CIR) during time
of arrival (TOA) estimation conducted by the FAP
estimator.

6. The system according to claim 5, wherein the feedback module comprises a signal quality
measurer;

wherein the feedback module is further configured to
incorporate the second SRSs into the signal quality
measurer for calculating reliability for the RTOA data
points by using measured signal quality of the corre-
sponding second SRS; and wherein the signal quality measurer is configured to
eliminate the RTOA data points which have reliability
lower than a pre-defined threshold and then calculate
the positioning estimation result using the remaining
RTOA data points with the FAP estimator collectively.

7. The system according to claim 6, wherein the signal
quality measurer determines whether to eliminate the target
RTOA data point according to its received signal strength
indicator (RSSI), reference signal received power (RSRP),
signal-to-noise ratio (SNR), and reference signal received
path power (RSRPP) of the corresponding second SRS and
according to the NLOS information.

8. The system according to claim 5, wherein the feedback module comprises a signal weight
assignment module;

wherein the feedback module is further configured to
incorporate the positioning estimation results into the
signal weight assignment module for calculating
weights for the positioning estimation results according
to signal quality; and wherein the weight assignment module is configured to
determine a final positioning result by using the posi-
tioning estimation results and the respective weights.

9. The system according to claim 1, wherein the signal
emitter is further configured to send the positioning estima-
tion result to a user interface for representing a modified
location of the UE with respect to the preliminary location
thereof.

10. A system using 5G positioning with non-line of sight
information, comprising:

a plurality of transmission and reception points (TRPs)
distributed in a target region and electrically coupled
with a user equipment (UE); and a backend server electrically coupled with the TRPs and
comprising:

a signal receiver configured to receive first sounding
reference signals (SRSs) from an object through the
TRPs;

a positioning module configured to compute a prelimi-
nary location of the object within the target region
according to the first SRS signals;

a signal emitter configured to send a location signal
containing the preliminary location of the object to
the object through the TRPs; and a feedback module configured to receive second SRSs
and non-line of sight (NLOS) information from the
object through the TRPs and to generate at least one
positioning estimation result by positioning the
object in response to the second SRSs in combina-
tion with the NLOS information.

11. The system according to claim 10, wherein the feedback module comprises a first arrival
path (FAP) estimator; and wherein the feedback module is further configured to
incorporate the NLOS information into the FAP esti-
mator to estimate relative time of arrival (RTOA) data
points by identifying a first peak in power of channel
impulse response (CIR) during time of arrival (TOA)
estimation conducted by the FAP estimator.

12. The system according to claim 11, wherein the feedback module comprises a signal quality
measurer;

wherein the feedback module is further configured to
incorporate the second SRSs into the signal quality
measurer for calculating reliability for the RTOA data
points by using measured signal quality of the corre-
sponding second SRS; and wherein the signal quality measurer is configured to
eliminate the RTOA data points which have reliability
lower than a pre-defined threshold and then calculate
the positioning estimation result using the remaining
RTOA data points with the FAP estimator collectively.

13. The system according to claim 12, wherein the signal
quality measurer determines whether to eliminate the target
RTOA data point according to its received signal strength
indicator (RSSI), reference signal received power (RSRP),
signal-to-noise ratio (SNR), and reference signal received
path power (RSRPP) of the corresponding second SRS and
according to the NLOS information.

14. The system according to claim 11, wherein the feedback module comprises a signal weight
assignment module and is further configured to incorporate the positioning estimation results into the signal weight assignment module for calculating weights for the positioning estimation results according to signal quality; and wherein the weight assignment module is configured to determine a final positioning result by using the positioning estimation results and the respective weights.

15. A system using 5G positioning with non-line of sight information, comprising:

a signal receiver configured to receive first sounding reference signals (SRSs);

a positioning module configured to compute a preliminary location in a map with respect to an object according to the first SRS signals;

a signal emitter configured to send a location signal containing the preliminary location of the object; and a feedback module activated by the signal emitter upon sending the location signal and configured to receive second SRSs and non-line of sight (NLOS) information and to generate at least one positioning estimation result by positioning the object in response to the second SRSs in combination with the NLOS information.

16. The system according to claim 15, wherein the feedback module comprises a first arrival path (FAP) estimator and is further configured to incorporate the NLOS information into the FAP estimator to estimate relative time of arrival (RTOA) data points by identifying a first peak in power of channel impulse response (CIR) during time of arrival (TOA) estimation conducted by the FAP estimator.

17. The system according to claim 16, wherein the feedback module comprises a signal quality measurer and is further configured to incorporate the second SRSs into the signal quality measurer for calculating reliability for the RTOA data points by using measured signal quality of the corresponding second SRS; and wherein the signal quality measurer is configured to eliminate the RTOA data points which have reliability lower than a pre-defined threshold and then calculate the positioning estimation result using the remaining RTOA data points with the FAP estimator collectively.

18. The system according to claim 17, wherein the signal quality measurer determines whether to eliminate the target RTOA data point according to its received signal strength indicator (RSSI), reference signal received power (RSRP), signal-to-noise ratio (SNR), and reference signal received path power (RSRPP) of the corresponding second SRS and according to the NLOS information.

19. The system according to claim 16, wherein the feedback module comprises a signal weight assignment module and is further configured to incorporate the positioning estimation results into the signal weight assignment module for calculating weights for the positioning estimation results according to signal quality; and wherein the weight assignment module is configured to determine a final positioning result by using the positioning estimation results and the respective weights.

20. The system according to claim 15, wherein the signal emitter is further configured to send the positioning estimation result to a user interface for representing a modified location of the object with respect to the preliminary location thereof.

* * * * *